United States Patent

Ono et al.

[11] 3,731,603
[45] May 8, 1973

[54] AUTOMATIC EXPOSURE TIME CONTROL DEVICE FOR CAMERAS

[75] Inventors: Shigeo Ono, Yokohama; Ichiro Hamaguchi, Tokyo, both of Japan

[73] Assignee: Nippon Kogaku K. K., Tokyo, Japan

[22] Filed: June 15, 1971

[21] Appl. No.: 156,956

Related U.S. Application Data

[63] Continuation of Ser. No. 13,078, Feb. 20, 1970, abandoned.

[30] Foreign Application Priority Data

Feb. 26, 1969 Japan..............................44/13980

[52] U.S. Cl................................95/10 CT, 95/10 CE
[51] Int. Cl................................G03b 7/08
[58] Field of Search...................95/10 CE, 10 CT; 356/223

[56] References Cited

UNITED STATES PATENTS

| | | | |
|---|---|---|---|
| 3,518,438 | 6/1970 | Hart et al. | 356/223 X |
| 3,528,350 | 9/1970 | Schmitt | 95/10 |
| 3,641,890 | 2/1972 | Ono | 95/10 |
| 3,520,597 | 7/1970 | Fujii | 95/10 C X |

*Primary Examiner*—Samuel S. Matthews
*Assistant Examiner*—Michael L. Gellner
*Attorney*—Joshua Ward et al.

[57] ABSTRACT

An improved automatic exposure time control device for cameras is composed of mechanical and electronical parts. A means is provided for converting the brightness of the object to be photographed into the control current including a photosensitive element and a capacitor wherein a differential amplifier is integrated, one input of said amplifier is subjected to a voltage proportional to logarithm of the brightness of the object and the other is subjected to a voltage in response to the exposure factors. Further an indicator is connected between said input terminals and another manually adjustable resistor is provided for manual control. The control current which sets exposure time is compensated for automatically by the circuit including the differential amplifier and the indicator with regard to the characteristics of the photosensitive element. When the mechanism is switched to manual control the measuring circuit having the indicator also acts as the interlocked exposure meter, and the exposure time may selectively coincide with either the indicated optimum value or the arbitrary deviated under-or over-exposure value.

4 Claims, 4 Drawing Figures

AUTOMATIC EXPOSURE TIME CONTROL DEVICE FOR CAMERAS

This application is a continuation of application Ser. No. 13,078, filed Feb. 20, 1970, now abandoned.

BACKGROUND OF THE INVENTION

The present invention relates to an exposure time control device for an electronic shutter of a camera with two shutter curtains.

One of which curtains is mechanically released so to open the exposure aperture while the other is electromagnetically released so as to close said aperture, the time interval between said sequential releases of the two shutter curtains being controlled automatically by means of an electronic circuit so as to provide an optimum exposure in response to exposure factors such as the brightness of an object to be photographed, the lens aperture and, the sensitivity of the film being used, etc.

In the conventional automatic exposure time control device of the camera described above, the retardation time is provided by a photoconductive element and a capacitor connected in series with each other so that the time required for charging said capacitor to a predetermined voltage is used as the retardation time.

In the third embodiment there is further provided a pointer or needle 27 and a needle follower 28 which are adapted to rotate coaxially with the indicator 12 in response to the movement of the tap 25 so as to cooperate with the scale 26.

The time t required for charging a capacitor having a capacitance C to a trigger level $V_t$ through a resistor having a resistance R is given by the following relation:

$$t = -CR \log(1 - V_t/V_o) \quad (1)$$

where $V_o$ = voltage of power source.
On the other hand, the time t is given by the following relation:

$$t = k_2 A^2 / BS \quad (2)$$

where $B$ = brightness of an object to be photographed,
$S$ = sensitivity of film,
$A$ = F-number of camera objective lens and
$k_2$ = a constant.
Eliminating t from Eqs. (1) and (2), we have $$R = \frac{k_2 A^2}{CBS \log\left(1 - \frac{V_t}{V_o}\right)} = k_1 B^{-1} \quad (3)$$

where $$k_1 = \frac{k_2 A^2}{CS \log\left(1 - \frac{V_t}{V_o}\right)}$$

That is, the resistance characteristics of photoconductive elements must satisfy Eq. (3). The resistance of most widely used CdS element may be given generally by the following relation:

$$R = k_1 B^{-\gamma} \quad (4)$$

Where $\gamma = 0.60$ to $0.90$. Thus, it is seen that $\gamma$ must be made equal to 1 by combining the photoconductive element with suitable means. For this purpose, there has been proposed a method in which the brightness of the object to be photographed is converted into a voltage whose value varies as a logarithm of the brightness; and the converted voltage is increased or decreased linearly and converted further into a current which is proportional to a value having the voltage as an exponent; and this current is used to charge the capacitor so that the time required for charging the capacitor to a trigger level may be used for controlling the exposure time.

One of the objects of the present invention is to provide an exposure control device for cameras of the character described above in which said means for linearly increasing or decreasing the voltage converted in a log manner also functions as means for previously indicating the exposure time, which is automatically controlled, thereby eliminating switching to a special circuit for the above indication.

Another object of the present invention is to provide an exposure time control device of the character described above in which when the device is switched to a manual exposure time control, said indicating means functions as an interlocked exposure meter, and is capable of giving the the priority to the shutter speed at the stage of determining the exposure time, thereby permitting arbitrary over- or under-exposure if required.

SUMMARY OF THE INVENTION:

In brief, the present invention provides an automatic exposure time control device for cameras of the type having means for actuating mechanically the start of the movement of the opening of a shutter and electromagnetically the start of the movement of the closing thereof, an electronic control circuit for automatically controlling the time interval between said opening and closing of said shutter in response to the exposure factors such as a lens aperture, the sensitivity of the film etc., said electronic control circuit including a device for converting the brightness of an object to be photographed into a voltage which varies as a logarithm of said brightness, device for increasing or decreasing linearly said voltage, device for converting said increased or decreased voltage into a current in proportion to the value having said voltage as an exponent, device for charging a capacitor with said current synchronized with said opening of said shutter until said capacitor is charged to a predetermined level, thereby controlling the exposure time by the time required by said capacitor to reach said predetermined charged voltage, characterized in that said current converting means is comprised of a differential amplifier whose one input is a voltage proportional to a logarithm of the brightness of the object and whose the other input is a voltage correlated with an exposure factor such as a lens aperture, the sensitivity of the film, etc.; an indicator interconnected between the terminals of said two inputs so that the coil resistance of said indicator functions as said voltage decreasing means; and a capacitor connected in one output circuit.

Furthermore, another manually adjustable resistor is provided for charging said capacitor in such a manner that the device for adjusting the resistance may selectively connect said capacitor to either said automatic control device or said resistor; and an indicating device which is adapted to co-operate with said indicator is operatively interconnected with said adjusting device so as to function as an interlocked exposure meter when the exposure time is manually controlled. The advantages accrued from the present invention are:

1. the means for compensating a photosensitive element is comprised of an indicator so that the compensation may be effectively accomplished;
2. the indicator is "fixed" relative to the measuring circuit as well as the control circuit so that the switching of the circuits for reading may be eliminated and eliminating the unstable factors adversely affecting adversely the operation of the device, such as faulty contacts, etc.;
3. the switching to the manual exposure time control can be made independently of the measuring circuit so that indicating means which coacts operatively with switching means may be advantageously used as the interlocked exposure meter;
4. when the device is used as said interlocked exposure meter, the over- or under-exposure may be arbitrarily given and a degree of the over- or under-exposure may be previously selected; and
5. the measuring and control circuits are arranged in symmetrical relation so that they are stabilized against the variation in the power source voltage and ambient temperature, etc.

The above and other objects, features and advantages of the present invention will become more apparent from the following description of some illustrative embodiments thereof with reference to the accompanying drawing.

BRIEF DESCRIPTION OF DRAWING:

Same parts are designated with the same reference numerals throughout the figures.

Figure 1:
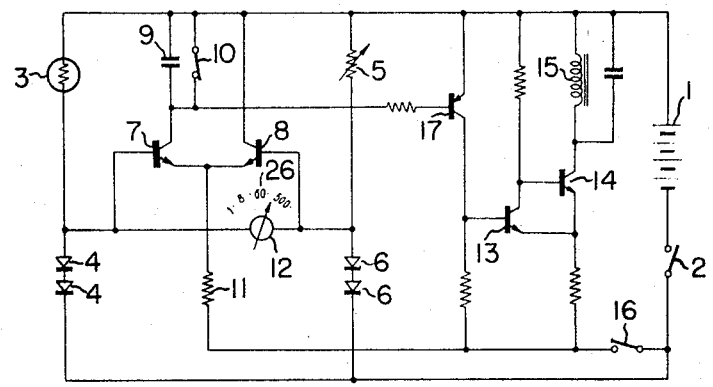
FIG. 1 is a circuit diagram of a first embodiment of the present invention.

DESCRIPTION OF THE PREFERRED EMBODIMENTS:

Referring to FIG. 1, the first embodiment of the present invention will be described thereinafter. Reference numeral 1 designates a power source; 2, a power source switch; 3, a photoresistive element; and 4, a logarithmic conversion diode. These components, 1 to 4 are connected in series so that when the switch 2 is closed, a voltage, in proportion to a logarithm of the brightness of the object to be photographed, is produced across the diode 4. Reference numeral 5 designates a variable resistor adapted to vary its resistance in response to the exposure factors such as a lens aperture, sensitivity of the film to be used, etc.; and 6, a diode similar to the diode 4. The variable resistor 5 may adjustably vary its resistance in proportion to the scales graduated in the geometrical progression in correspondence with the sensitivity of the film or the lens apertures. That is, the adjustable resistor 5 is a "log resistor" so that a voltage in proportion to the logarithm of the film sensitivity and the aperture may be produced across the diode 6. Reference numerals 7 and 8 designate transistors which construct a so-called differential amplifier the inputs of which are applied from the diodes 4 and 6. A capacitor 9 and a trigger switch 10 are connected in parallel to the collector circuit of the transistor 7, and the emitter circuit of both of the transistors 7 and 8 are connected to a common resistor 11 so as to control the sum of the current flowing through the transistors 7 and 8. Therefore, it is seen that the current flowing through the transistor 7 is controlled by the difference between the input voltage of the transistor 7 and that of the transistor 8. The operating range is set in the saturated region of the collector current, so-called non-linear region in which the logarithm of the collector current is in proportion to the input voltage. The base electrodes of the transistors 7 and 8 are connected to an indicator 12 which is adapted to predict the potential difference between the inputs, that is the exposure time to be set. By selecting the resistance of the coil incoporated in the indicator 12, the variation in input voltage of the transistor 7 due to the variation in brightness of objects to be photographed may be controlled. In other words, when the intensity of light incident upon the photoconductive element 3 is decreased, the voltage across the diode 4 is lowered, but the increment of the current flowing through the indicator 12 is applied to the diode 4 so that the change of the current flowing across the diode 4 is accordingly decreased, whereby the same effect as that obtained by compensating the characteristics of the photoresistive element 3 may be attained.

Transistors 13 and 14 constitute a Schmidt trigger and the collector circuit of the transistor 14 is connected to a coil 15 which is adapted to energize a magnet for controlling the second shutter curtain. When a switch 16 is closed, both of the above described differential amplifier and the Schmidt trigger are energized or actuated. When the switch 16 is operatively connected to a moving member which is moved prior to the actuation of the shutter mechanism (for example, a hinged reflecting mirror of a single-lens reflex camera), the economy of the power consumption may be achieved. Upon closing the switch 16, the transistor 14 is driven into the conductive state so that the magnet is energized. When positive pulses are applied to the transistor 13, it is driven into the conductive state while the transistor 14 is driven into the non-conductive state so that the magnet is de-energized thereby releasing the second shutter curtain. A transistor 17 is provided to amplify the current from the capacitor 9 so as to apply the amplified current to the transistor 13.

Next, the mode of operation will be described hereinafter. When the sensitivity of the film loaded in the camera and the lens aperture are set, the resistance of the variable resistor 5 is set in response to the above setting operation. Next, the power switch 2 is closed and the camera is directed toward the object to be photographed. Then the current flows through a bridge circuit consisting of the photoconductive element 3, the diode 4, the variable resistor 5, the diode 6 and the indicator 12 so that the pointer of the indicator 12 swings by the unbalanced current of the bridge circuit in response to the brightness of the object, thus indicating a suitable shutter speed for optimum exposure.

Next, the shutter button is depressed so that the switch 16 is closed in such a manner as to energize the magnet and move the reflecting mirror. Thereafter, the first curtain of the shutter is mechanically released while the trigger switch 10 is opened so that the charging of capacitor 9 by the current which is controlled by the potential difference between the inputs to the differential amplifier begins. As the capacitor 9 is charged, the current flowing through the transistor 17 is accordingly increased so that the base potential of the transistor 13 is increased, finally reaching the trigger level. Then, the transistor 14 is suddenly driven into the non-conductive state so that the magnet is de-energized whereby the second shutter curtain is released, thereby completing the exposure operation.

Figure 2:
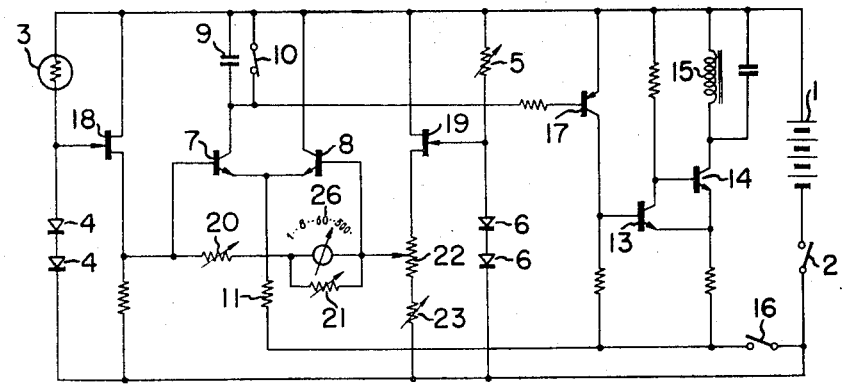
FIG. 2 is a circuit diagram of a second embodiment thereof.

With reference to FIG. 2, the second embodiment of the present invention will be described hereinafter. The remarkable feature of the second embodiment is that the voltages across the diode 4 and 6 in the first embodiment are applied to the differential amplifier through a source follower constituted by field-effect transistors 18 and 19. In this arrangement the following points are improved. That is, the field effect transistors operate in the region where the gate voltage is lower than source voltage so that the input voltage to the differential amplifier may be increased and the current is amplified whereby the operation is stabilized. Reference numeral 20 designates a variable resistor for fine adjustment of the photoconductive element, and 21, is a variable resistor connected in parallel with the indicator 12 for adjustment of the sensitivity of the indicator 12. In this case, the combined resistance of the indicator 12 and the variable resistors 20 and 21 are so selected as to be of suitable value for optimum exposure calibration. A source resistor 22 of the transistor 19 is used as a voltage divider so that the mismatching between the ratio of the variation in the resistance of the photoconductive element in response to the brightness and the ratio of the variation in the resistance of the variable resistor 5 with respect to the sensitivity of the film, etc. may be suitably corrected. A variable resistor 23 serves to approximately correct the relative difference between the resistances of the photo-conductive element 3 and the variable resistor 5. The function of each of the components from 1 to 17 and the over-all function of the second embodiment are the same as those described with reference to FIG. 1.

Figure 3:
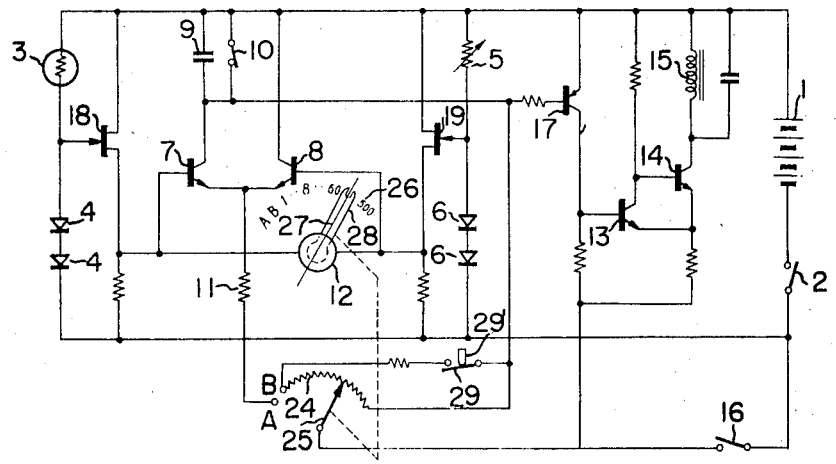
FIG. 3 is a circuit diagram of a third embodiment thereof.

Next, the third embodiment of the present invention will be described with reference to FIG. 3 hereinafter. The third embodiment further comprises a circuit for manually controlling the exposure time. A variable resistor 24 and a tap 25 are provided so that the resistance of the variable resistor 24 may be varied by sliding the tap 25 and the capacitor 9 may be selectively connected in series to either of the differential amplifiers 7 or 8 or the variable resistor 24. In such conventional automatic exposure time control devices, when cadmium sulfide (CdS), which is most widely used in the cameras, is employed as a photoconductive element, the characteristics of the CdS element must be corrected.

Figure 4:
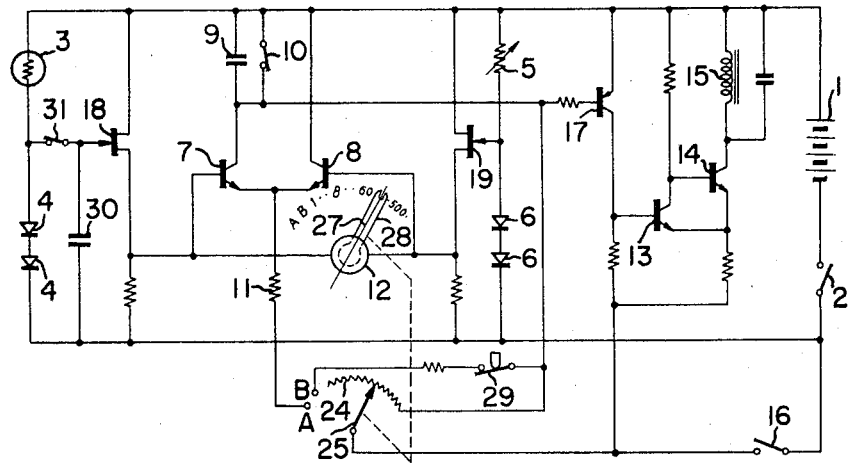
FIG. 4 is a circuit diagram of a variation of FIG. 3 illustrating memory means which is used in a camera of the type in which the brightness of the object to be photographed is measured by the light passing through a camera objective lens.

When the tap 25 is interconnecting the capacitor 9 with the differential amplifier, the needle follower 28 indicates the letter A on the scale, which means the shutter mechanism is under automatic control. When the tap 25 is connecting the capacitor to the variable resistor 24, the needle follower 28 is adapted to indicate an exposure time or shutter speed which is controlled in response to the resistance of the variable resistor 24. Even when switched to the manual control, the measurement circuit consisting of the photoconductive element 3, the diode 4, the variable resistor 5, the diode 6 and the indicator 12 or the photoconductive element, 3, the diode 4, the variable resistor 5, the diode 6, the indicator 12 and the field effect transistors 18 and 19 operates independently, so that the needle follower 28 may be so set as to coincide with the pointer 27 so as to set the aperture, thereby providing an interlocked exposure meter. Reference numeral 29 designates a "bulb" switch; and 29', a shutter release button. When the button is pressed for shutter release the switch 29 is opened while the button 29' is released the switch 29 is closed so that the capacitor 9 is immediately charged, thereby releasing the second shutter curtain. FIG. 4 is a circuit diagram having a memory device which is required to be incorporated in a camera of the type in which the intensity of light is measured through an objective lens thereof. When photoconductive element 3 is for example positioned behind a pentaprism in the viewfinder system, the hinged reflecting mirror is moved away from the optical path when the shutter mechanism is actuated so that the light will not be made incident upon the photoconductive element 3. This is the reason why the memory for storing the intensity of light must be provided prior to the actuation of the shutter. For this purpose, a capacitor 30 is provided with one terminal thereof being connected to the gate of the field-effect transistor 18. Furthermore, the capacitor 30 is so arranged as to be selectively connected in parallel with the diode 4 through a switch 31.

Next, the mode of operation will be described. When the reflecting mirror is located in its reflecting position in a single-lens reflex camera, the switch 31 is normally closed so that the capacitor 30 is charged to a voltage corresponding to that across the diode 4. When shutter button is pressed, the switch 31 is opened before the reflecting mirror is retracted from the optical path so that the voltage across the capacitor 30 will not vary even when the light incident upon the photoconductive element 3 is interrupted. That is, the exposure time is controlled by the voltage stored or memorized by the capacitor 30. The present invention has been so far described with particular reference to some illustrative embodiments thereof, but it will be understood that variations and modifications can be effected without departing from the true spirit of the present invention as described hereinabove and as defined in the appended claims.

We claim:
1. A camera comprising
   an automatic exposure time control means for automatically controlling the time interval between movements of opening and closing of a shutter, including
   means for mechanically starting the movement of the opening of the shutter; means for electromagnetically starting the movement of the closing of the shutter;

first means for converting the brightness of the object to be photographed into a first voltage varying as a logarithm of said brightness;

second means for producing a second voltage correlated with a lens aperture and the film sensitivity; means for increasing or decreasing linearly said first voltage; and means for actuating said electromagnetically starting means in accordance with said increased or decreased voltage and said second voltage;

indicator means coupled to said first and second means for indicating the exposure time to be determined by said increased or decreased voltage and second voltage;

manual control means including selector means for manually setting shutter speed to thereby control the exposure time in response to said preset shutter speed;

means for selectively actuating said automatic exposure time control means or said manual control means; and pointer means coupled to said selector means and cooperating with said indicator means to indicate the preset shutter speed.

2. In an automatic exposure time control device for cameras having means for mechanically starting the movement of the opening of a shutter and electromagnetically starting the movement of closing thereof, an electronic control circuit for automatically controlling the time interval between said opening and closing of said shutter mechanism in response to the brightness of the object to be photographed, a lens aperture and the film sensitivity, said electronic control circuit including means for converting the brightness of the object to be photographed into a voltage varying as a logarithm of said brightness, means for increasing or decreasing linearly said voltage, means for converting said increased or decrease voltage into a current in proportion to the value having said voltage as an exponent, and means for charging a capacitor with said current synchronized with said opening of said shutter mechanism until said capacitor is charged to a predetermined level, thereby controlling the exposure time by the time required by said capacitor to reach said predetermined charged voltage, an improvement resides in that said current converting means is comprised of a differential amplifier whose one input is a voltage proportional to a logarithm of the brightness of the object and whose other input is a voltage correlated with an exposure factor such as a lens aperture and the film sensitivity, an indicator being interconnected between the terminals of said two inputs so that the coil resistance of said indicator functions as said voltage decreasing means, and said capacitor being connected in one differential amplifier output.

3. An automatic exposure time control device for cameras as set forth in claim 1 wherein an adjustable resistor is provided for charging said capacitor in such a manner that means for adjusting the resistance of said resistor may selectively connect said capacitor to either of said current converting means or said adjustable resistor, and an indicating means is further provided for coacting with said indicator and being operatively interconnected with said adjusting means so as to function as an interlocked exposure meter when the exposure time is manually controlled.

4. A camera comprising an automatic exposure time control means for automatically controlling the time interval between movements of opening and closing of a shutter, said automatic exposure time control means including means for mechanically starting the movement of the opening of the shutter;

means for electromagnetically starting the movement of the closing of the shutter;

first means having a photoconductive element and first diodes connected in series with said element for converting the brightness of the object to be photographed into a first voltage varying as a logarithm of said brightness;

second means having a variable resistor and second diodes connected in series with said variable resistor for producing a second voltage correlated with a lens aperture and the film sensitivity, the resistance of said variable resistor being varied in accordance with said lens aperture and the film sensitivity;

capacitor memory means connected to the junction between said photo-conductive element and said first diodes for storing said first voltage;

first and second impedance converting circuits of which each input impedance is very high and of which each output impedance is relatively low, the input terminal of said first impedance circuit being connected to said memory means, the input terminal of said second impedance circuit being connected to the junction between said variable resistor and said second diodes;

indicator means connected between the output terminals of said first and second impedance circuits for indicating the exposure time, the coil resistance of said indicator means decreasing the output voltage of said first impedance circuit;

a differential amplifier of which one input terminal is connected to the output terminal of said first impedance circuit and of which the other input terminal is connected to the output terminal of said second impedance circuit; and capacitor circuit having a capacitor and connected to the output of said differential amplifier for charging said capacitor with the output current of the differential amplifier, said capacitor circuit actuating said electromagnetically starting means to terminate the exposure when said capacitor is charged at a predetermined level;

manual control means for manually controlling the exposure time, including an adjustable resistor and means for adjusting the resistance of said adjustable resistor; change-over means for selectively actuating said automatic exposure time control means or said manual control means, said capacitor being charged with a current flowing through said adjustable resistor when said manual control means is actuated by said change-over means, whereby the exposure time for manual exposure control is determined by the resistance of said adjustable resistor;

pointer means coupled to said adjusting means of said manual control means and cooperating with said indicator means to indicate the exposure time determined by adjusting the resistance of said adjustable resistor.

* * * * *